(12) United States Patent
Ehrentraut

(10) Patent No.: US 10,181,865 B2
(45) Date of Patent: Jan. 15, 2019

(54) MOBILE WIRELESS DEVICE FOR A MOTOR VEHICLE, AND METHOD FOR OPERATING THE MOBILE WIRELESS DEVICE

(71) Applicant: AUDI AG, Ingolstadt (DE)

(72) Inventor: Herbert Ehrentraut, Beilngries (DE)

(73) Assignee: AUDI AG, Ingolstadt (DE)

( * ) Notice: Subject to any disclaimer, the term of this patent is extended or adjusted under 35 U.S.C. 154(b) by 50 days.

(21) Appl. No.: 14/416,129

(22) PCT Filed: Jun. 26, 2013

(86) PCT No.: PCT/EP2013/001874
§ 371 (c)(1),
(2) Date: Jan. 21, 2015

(87) PCT Pub. No.: WO2014/015933
PCT Pub. Date: Jan. 30, 2014

(65) Prior Publication Data
US 2015/0200691 A1    Jul. 16, 2015

(30) Foreign Application Priority Data
Jul. 21, 2012 (DE) .................. 10 2012 014 548

(51) Int. Cl.
*H04B 1/00* (2006.01)
*H04L 29/08* (2006.01)

(52) U.S. Cl.
CPC .......... *H04B 1/006* (2013.01); *H04B 1/0064* (2013.01); *H04L 67/12* (2013.01)

(58) Field of Classification Search
CPC .. H04B 7/0691; H04B 7/0814; H04B 7/0602; H04B 7/0874
See application file for complete search history.

(56) References Cited

U.S. PATENT DOCUMENTS 6,725,039 B1* 4/2004 Parmar ............ H04W 36/0061
                                                     455/436
8,463,976 B2   6/2013 Kim et al.
(Continued)

FOREIGN PATENT DOCUMENTS

CN    1132579    10/1996
CN    1394093    1/2003
(Continued)

OTHER PUBLICATIONS

Chinese Office Action dated Oct. 11, 2016 in Chinese Patent Application No. 201380038795.9.
(Continued)

*Primary Examiner* — Frantz Bataille
(74) *Attorney, Agent, or Firm* — Staas & Halsey LLP

(57) ABSTRACT

A mobile radio apparatus for a motor vehicle has a first mobile radio module and a second mobile radio module. Furthermore, a first antenna and a second antenna are provided for transmitting mobile radio signals. To provide robust voice telephony for the motor vehicle that can be implemented with little circuit complexity, a switching device is connected to the antennas and to a respective signal connection of the mobile radio modules and that is designed to take a switching signal as a basis for changing over between a first switching state, in which the first signal connection is coupled to the first antenna and the second signal connection is coupled to the second antenna, and a second switching state, in which the first signal connection is coupled to the second antenna and the second signal connection is coupled to the first antenna.

23 Claims, 2 Drawing Sheets

(56) References Cited

U.S. PATENT DOCUMENTS

| | | | |
|---|---|---|---|
| 2004/0092286 A1* | 5/2004 | Stattin | H04B 1/0057 455/552.1 |
| 2004/0180653 A1* | 9/2004 | Royalty | B64D 47/00 455/431 |
| 2005/0003864 A1 | 1/2005 | Elliot et al. | |
| 2005/0075128 A1 | 4/2005 | Diedrich et al. | |
| 2005/0153743 A1* | 7/2005 | Berra | H04W 36/0061 455/560 |
| 2006/0073829 A1 | 4/2006 | Cho et al. | |
| 2007/0082622 A1* | 4/2007 | Leinonen | H04B 1/005 455/78 |
| 2007/0142001 A1 | 6/2007 | Sanders | |
| 2008/0077882 A1 | 3/2008 | Kramer et al. | |
| 2008/0125167 A1 | 5/2008 | Fujii et al. | |
| 2008/0192806 A1 | 8/2008 | Wyper et al. | |
| 2009/0262669 A1* | 10/2009 | Sanders | H04B 1/006 370/278 |
| 2010/0234071 A1 | 9/2010 | Shabtay et al. | |
| 2010/0304737 A1 | 12/2010 | Jain et al. | |
| 2010/0325335 A1 | 12/2010 | Kim et al. | |
| 2011/0136446 A1* | 6/2011 | Komninakis | H04B 7/0691 455/78 |
| 2011/0149908 A1* | 6/2011 | Olsson | H04W 36/0022 370/331 |
| 2011/0302411 A1* | 12/2011 | Liang | H04L 63/0823 713/158 |
| 2012/0027221 A1* | 2/2012 | Davis | H04B 1/3822 381/86 |
| 2012/0033718 A1 | 2/2012 | Kauffman et al. | |
| 2012/0071086 A1 | 3/2012 | Wu et al. | |
| 2012/0202561 A1* | 8/2012 | Robinett | H04B 1/006 455/552.1 |

FOREIGN PATENT DOCUMENTS

| | | |
|---|---|---|
| CN | 1604393 | 4/2005 |
| CN | 101375526 | 2/2009 |
| CN | 101707797 | 5/2010 |
| CN | 201839451 | 5/2011 |
| DE | 102012014548.9 | 7/2012 |
| EP | 2 134 000 | 12/2009 |
| EP | 2134000 | 12/2009 |
| KR | 102010138751 | 12/2010 |
| WO | 2005/125023 | 12/2005 |
| WO | PCT/EP2013/001874 | 6/2013 |

OTHER PUBLICATIONS

German Office Action for German Priority Patent Application No. 10 2012 014 548.9, dated Apr. 15, 2013, 5 pages.
English language International Search Report for PCT/EP2013/001874, dated Jan. 3, 2014, 2 pages.
WIPO English language translation of the International Preliminary Report on Patentability for PCT/EP2013/001874, 10 pages, downloaded from WIPO website Jan. 21, 2015.
Chinese Office Action for related Chinese Patent Application No. 201380038795.9, dated Sep. 14, 2015, 10 pages.
Office Action dated Apr. 25, 2016 in Chinese Patent Application No. 201380038795.9.
European Search Report dated Aug. 23, 2016 in corresponding European Patent Application No. 16 00 0773.8.

* cited by examiner

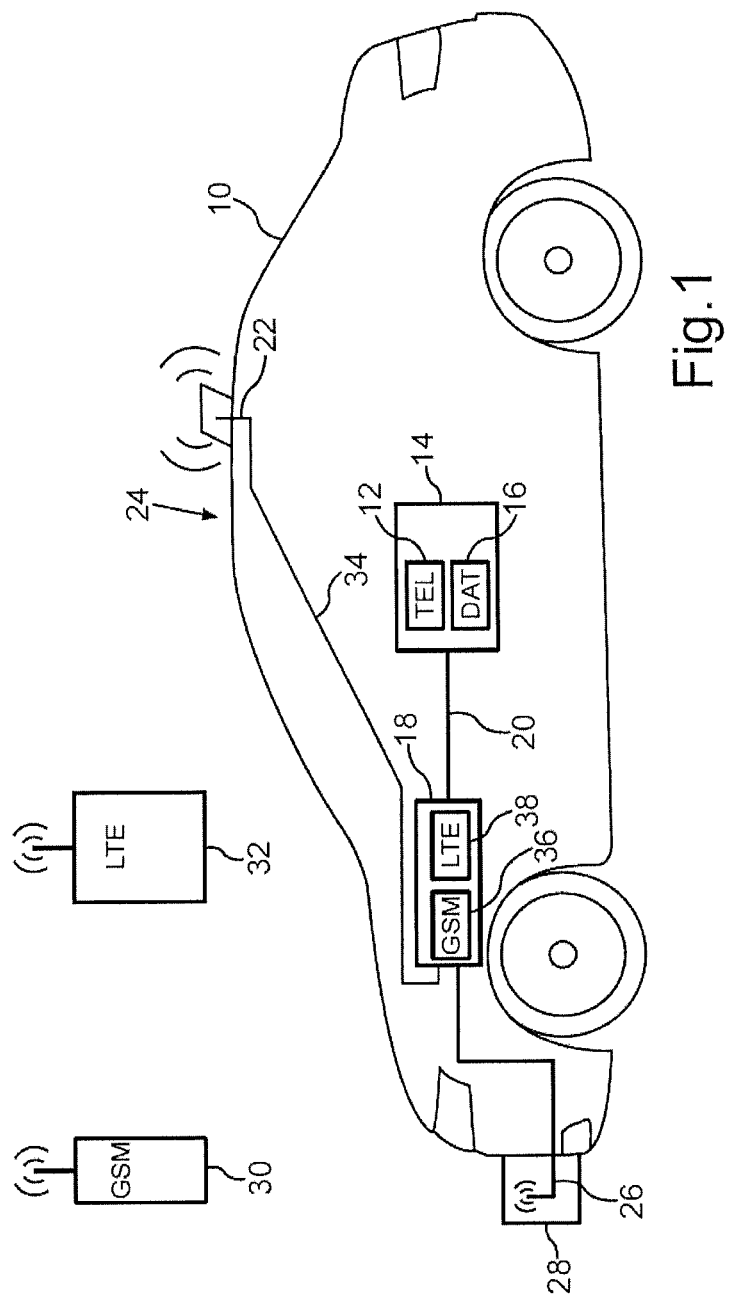

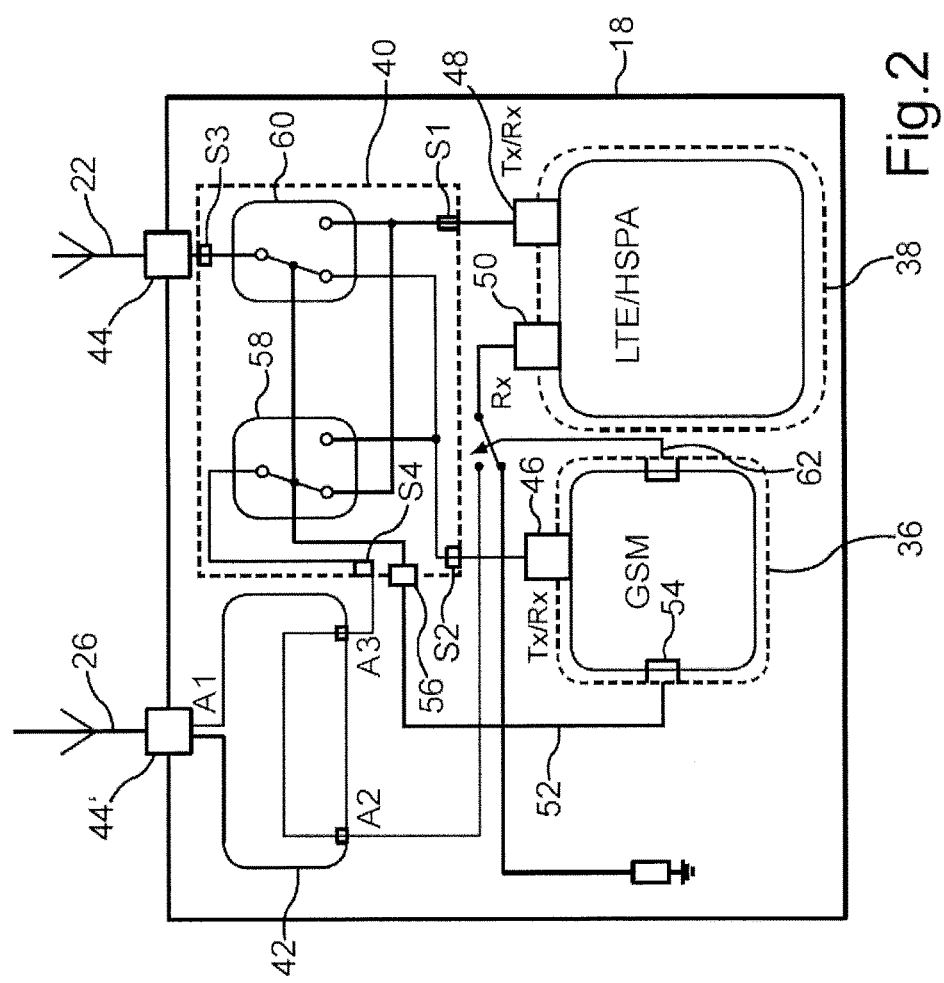

MOBILE WIRELESS DEVICE FOR A MOTOR VEHICLE, AND METHOD FOR OPERATING THE MOBILE WIRELESS DEVICE

CROSS REFERENCE TO RELATED APPLICATIONS

This application is based on and hereby claims priority to International Application No. PCT/EP2013/001874 filed on Jun. 26, 2013 and German Application No. 10 2012 014 548.9 filed on Jul. 21, 2012, the contents of which are hereby incorporated by reference.

BACKGROUND

The invention relates to a mobile radio apparatus for a motor vehicle that has two mobile radio modules that can be used to interchange a mobile radio signal with an external mobile radio station. The invention also relates to a motor vehicle having such a mobile radio apparatus and to a method for operating the mobile radio apparatus.

A mobile radio module in such a motor vehicle can allow telephone calls to be made using the mobile radio network of a mobile radio operator from a telephone in the motor vehicle. The term motor vehicle is understood to mean, for example, an automobile or a heavy goods vehicle. Such a mobile radio module usually comprises one or more integrated circuits (computer chip) that take the digital data that is to be sent and produce a mobile radio signal that can be output via a signal connection to an antenna so as to be sent therefrom to a mobile radio station. Conversely, a mobile radio signal received from such a mobile radio station can be processed by the mobile radio module in order thus to extract the voice data that the mobile radio signal contains. Besides telephony, such a mobile radio link can also be used to transmit digital useful data of another type, particularly network data for data interchange with the Internet, that is to say e-mails or browser data, for example.

With the advancing development of mobile radio technology, a motor vehicle needs to ensure that the mobile radio apparatus installed therein can also communicate with the mobile radio stations of different mobile radio standards. To this end, it is known practice, for example, to provide a mobile radio module in a mobile radio apparatus, designed for transmission on the basis of the GSM standard (global system for mobile communications) or for signal transmission on the basis of the UMTS standard (UMTS—universal mobile telecommunication system). Data transmission between the motor vehicles and a mobile radio network then takes place in each case via that mobile radio module for which a suitable mobile radio station is available in the surroundings of the motor vehicle.

In connection with multipath reception of mobile radio signals, it is known practice for two or more antennas to be provided in a motor vehicle.

When developing a motor vehicle, it must be borne in mind, in connection with the provision of mobile radio apparatuses for new telecommunication standards, that such new standards do not always work reliably in the first few years following introduction. By way of example, in the case of the new LTE standard (LTE—long term evolution), the envisaged transmission type for telephony VoLTE is not yet supported by the mobile radio networks. Instead, it is necessary to revert to an earlier standard, for example UMTS or GSM. On the basis of experience, the implementation of LTE in motor vehicles will therefore involve technical difficulties, which means that it is desirable to have a redundant fallback solution.

SUMMARY

It is one possible object to provide robust voice telephony for a motor vehicle that can be implemented with little circuit complexity.

The inventor proposes a mobile radio apparatus that has two mobile radio modules for interchanging a mobile radio signal with an external mobile radio station. In this case, the first mobile radio module is designed to interchange the mobile radio signal on the basis of at least one first mobile radio standard, and the second mobile radio module interchanges its mobile radio signal with a mobile radio station on the basis of a second mobile radio standard. In this case, it is not significant whether both mobile radio modules communicate with the same mobile radio station or with different mobile radio stations. For receiving and sending the mobile radio signal, each mobile radio module has an appropriate signal connection. The first module may have at least one of the standards LTE, UMTS and GSM, and the second may have just GSM, for example. The mobile radio apparatus additionally has a first and a second antenna for transmitting the mobile radio signals. In this case, the two mobile radio modules share the two antennas. To this end, a switching device is provided that is connected to the antennas and to the respective signal connection of the mobile radio modules. The switching device is designed to take a switching signal as a basis for changing over between a first switching state and a second switching state. In this case, the first switching state is defined by virtue of the signal connection of the first mobile radio module (subsequently called the first signal connection) being coupled to the first antenna and the signal connection of the second mobile radio module (subsequently called second signal connection) being coupled to the second antenna. Conversely, second switching state of the switching device is defined by virtue of the first signal connection being coupled to the second antenna and the second signal connection being coupled to the first antenna.

The proposal has the advantage that, with an antenna system comprising two or more antennas for antenna diversity, two different mobile radio modules can be operated at the same time without this involving any relevant band reduction in the transmission bandwidth for the user of the mobile radio apparatus in a motor vehicle. In the case of the first and second antennas provided for antenna diversity, it can usually be assumed that one of them, it will be subsequently be assumed that it is the first antenna, is in a position in the motor vehicle that is relatively favorable for interference-free signal interchange, while the second antenna is an auxiliary antenna for antenna diversity. If only the first mobile radio module transmits a mobile radio signal and in so doing uses both antennas for the antenna diversities, the switching device can be used to switch the second mobile radio module to the second antenna, i.e. the auxiliary antenna, so that the second antenna can still be used via the second mobile radio module to receive control data from a mobile radio station. As soon as the second mobile radio module is also intended to be used for transmitting a mobile radio signal, the switching device can be used to switch the second mobile radio module to the first antenna, that is to say the main antenna with the better transmission properties. For this period, the first mobile radio module can be connected to the second antenna and continue to perform the signal transmission using the second antenna.

The inventor also proposes a motor vehicle that has an embodiment of the proposed mobile radio apparatus. In particular, the motor vehicle does not require the two antennas to be equally suited to interference-free transmission of a mobile radio signal. Accordingly, one embodiment of the motor vehicle provides for the first antenna to have lower directivity than the second antenna. Lower directivity implies that the first antenna is shielded with respect to the environment by the remainder of the components of the motor vehicle to a lesser extent than the second antenna. The first antenna can thus more easily be used to interchange a mobile radio signal with a mobile radio station in any direction in the surroundings of the motor vehicle. The embodiment has the advantage that the second antenna may be arranged at a less exposed location of the motor vehicle, for example in a bumper. With regard to the first antenna, the latter is preferably arranged on a roof of the motor vehicle. This allows the first antenna to be used to maintain a line of sight to mobile radio stations in a horizontal plane around the motor vehicle.

In particular, provision is made for the first mobile radio module to be used to allow signal transmission on the basis of a more modern mobile radio standard than the second mobile radio module. In accordance with one development of the mobile radio apparatus, the first mobile radio module is therefore designed to interchange digital user data that are different than voice data by the first mobile radio signal, that is to say the data relating to a video transmission, e-mails, Internet data relating to Internet pages and the like. By contrast, the second mobile radio module is preferably designed to interchange a voice telephony signal as the second mobile radio signal. This results in the advantage that the first mobile radio module provides a more modern broadband link for data processing appliances to a data network, particularly the Internet. In good time, the second mobile radio module can be used to provide a robust, older technology for interference-free voice transmission. In particular, the mobile radio module has provision for the first mobile radio module to interchange the mobile radio signal on the basis of at least one of the following mobile radio standards: LTE, UMTS, HSPA (high speed packet access). Accordingly, one development of the mobile radio apparatus provides for the second mobile radio module to be a GSM module.

In order to provide the best possible transmission and/or reception conditions for the two mobile radio modules according to the situation, the proposed method provides for the changeover device to be kept in the second switching state during transmission of a voice telephony signal and otherwise for the changeover device to be kept in the first switching state. In other words, the second mobile radio module is coupled to the first antenna during the transmission of a voice telephony signal, the first antenna being assumed in this case to be the antenna with the more favorable transmission and/or reception properties. In the course of this, the first mobile radio module is coupled to the second, weaker antenna. As soon as the telephone call has ended, that is to say that no further voice telephony signals are being transmitted, the changeover device is returned to the first switching state, so that the first mobile radio module sends and receives via the first antenna again. The method has the advantage that during a telephone call a user is always provided with the best possible signal connection during a telephone call by the second mobile radio module. If, on the other hand, the user uses the first mobile radio module, for example in order to look for information on the Internet, the first antenna is likewise usually used in the course of this. In this connection, it has been found that a delay in the data transmission in the event of the user making a telephone call during the download of information from the Internet is barely perceived by the user. There is therefore no problem if during a telephone call the first mobile radio module is able to interchange mobile radio signals only via the second antenna.

In relation to the control of the switching device, one development of the mobile radio apparatus provides a changeover device that is designed to switch the switching device to the second switching state at the beginning of a voice transmission by producing a predetermined switching signal. This results in the advantage that the second mobile radio module uses the first antenna only when required and otherwise interchanges control data and the like with mobile radio stations using the second antenna. Expediently, the changeover device is provided as part of the second mobile radio module. In this case, a control output of the second mobile radio module for outputting the control signal described is coupled to a control input of the switching device. This results in the advantage that the second mobile radio module can automatically change over the switching device from the first to the second switching state whenever the second mobile radio module recognizes the need for signal transmission via the first antenna.

In this connection, one development of the method provides for a call from outside the motor vehicle to prompt the switching device to be changed over from the first to the second switching state by virtue of a predetermined switching signal being produced. This results in the advantage that incoming telephone calls are received via the first antenna.

Another development of the method provides for call setup a voice connection by the second mobile radio module to prompt the switching device to be likewise changed over from the first to the second switching state by virtue of a predetermined switching signal being produced. This results in the advantage that voice connections from the vehicle are also sent via the first antenna.

To allow the two antennas to be used for the first mobile radio module within the context of antenna diversity, one development of the mobile apparatus provides for the first mobile radio module to have a further signal connection that is permanently connected to the second antenna, that is to say continuously and regardless of the switching state of the switching device.

Expediently, this involves the second antenna being connected via a splitter firstly to the switching device and secondly to the further signal connection. This results in the advantage that when both antennas are used simultaneously by the first mobile radio module there is only a relatively low resultant loss of power in the first mobile radio signal. In other words, the first mobile radio module and the antenna diversity can be used to provide almost the same transmission quality for the mobile radio apparatus as for a conventional mobile radio apparatus that has only a single mobile radio module and associated antennas.

The method additionally provides for the attenuation of the antenna signal for the second mobile radio module to be minimized by circuitry measures. In the case of a voice connection, the first antenna is switched to the second mobile radio module using only one changeover switch.

In the case of operation in the GSM radio network, a transmission pulse from the second reception module can impair the reception properties of the first mobile radio module. The method additionally provides for the second mobile radio module to generate a signal before a transmission pulse. This signal can be used to take protective measures for the first module in the event of a transmission pulse from the second module. By way of example, the antenna signal can be briefly isolated from the first module in the event of a transmission pulse.

With regard to the implementation of the mobile radio apparatus in terms of circuitry, said mobile radio apparatus preferably comprises a plug-in card on which both mobile radio modules are arranged. This results in the advantage that the mobile radio module can be plugged into a slot that is provided for a conventional mobile radio apparatus having just one mobile radio module. This means that it is not necessary, when redeveloping a motor vehicle, to also provide further circuit measures for the use of both mobile radio modules of the mobile radio module. All elements that are required in terms of circuitry may be provided on the one plug-in card.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic illustration of a potential embodiment of the proposed motor vehicle and FIG. 2 shows a schematic design of a potential embodiment of the proposed mobile radio apparatus as may be installed in the motor vehicle of FIG. 1

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the example explained below, the described components of the motor vehicle and of the mobile radio apparatus are each individual features that can be considered independently of one another and that each can also potentially develop the motor vehicle and the mobile radio apparatus. The components can be used in different combinations than that shown. Furthermore, the embodiment described can also be augmented by further features from those already described.

FIG. 1 shows a motor vehicle 10, which may be an automobile, for example. The motor vehicle 10 contains a telephone 12. The telephone 12 may be permanently installed in the motor vehicle 10. The motor vehicle 10 may additionally comprise a computer 16 that may be part of the infotainment system 14, for example, and allows a user of the motor vehicle 10 to interchange data with the Internet. For the interchange of telephony data or the user data for the computer 16 and further data processing devices, not shown, which user data are different than the voice data, the motor vehicle 10 has a mobile radio unit 18. By way of example, the mobile radio unit 18 may be connected to the infotainment system 14 via a digital communication bus 20. The mobile radio unit 18 can be used to transmit the telephony data and the remainder of the user data to a mobile radio network (not shown), from where they can then be transmitted to another terminal in the case of telephony data and to the Internet, for example, in the case of user data. For the purpose of sending and receiving the mobile radio signals, the mobile radio unit 18 has two antennas, among which a main antenna 22 may be arranged on a roof 24 of the motor vehicle 10 and a secondary antenna 26 may be arranged in a bumper 28, for example, of the motor vehicle 10. The main antenna 22 has lower directivity than the secondary antenna 26, which is shielded to some extent by the sheet metal of the motor vehicle 10 in the horizontal direction. The mobile radio unit 18 uses the antenna 22, 26 to interchange mobile radio signals with mobile radio stations 30, 32, which are in turn connected to the aforementioned mobile radio networks. By way of example, the mobile radio station 30 may be a GSM mobile radio station, and the mobile radio station 32 may be a UMTS mobile radio station or an LTE mobile radio station. The lower directivity of the main antenna 22 implies that it is more likely for an interference-free radio link to surrounding mobile radio stations to be set up with the main antenna 22 than with the partially shielded secondary antenna 26. Since only the main antenna 22 is mounted on the roof 24, it is only necessary for a connecting cable 34 to be laid in the motor vehicle 10 from the mobile radio unit 18 to the roof 24.

The mobile radio unit 18 is capable of interchanging data with both mobile radio stations 30, 32 on the basis of the respective mobile radio standards (in this case to GSM and LTE in this example). To this end, the mobile unit 18 has a GSM mobile radio module 36 and an LTE mobile radio module or a combined LTE/UMTS/GSM mobile radio module 38. The design of the mobile radio unit 18 is explained once again in more detail below with reference to FIG. 2.

By way of example, the mobile radio module 36 and the mobile radio module 38 may each be an ASIC (application specific integrated circuit), an FPGA (field programmable gate array), a DSP (digital signal processor) or a CPU (general purpose processing unit). Mobile radio modules such as the mobile radio module 36 and the mobile radio module 38 are known per se from the related art. The mobile radio unit 18 additionally comprises a switching device 40 and a splitter 42. The main antenna 22 is connected to the mobile radio unit 18 via a main antenna connection 44. The secondary antenna 26 is connected to the mobile radio unit 18 via a secondary antenna connection 44'.

The mobile radio module 38 is connected to the switching device 40 via a signal connection 48 for sending and receiving a mobile radio signal. By way of example, the switching device 40 may be an integrated circuit. A signal connection 46 of the mobile radio module 36 is likewise connected to a connection S2 of the switching device 40. The main antenna connection 44 is connected to a connection S3 of the switching device 40, and a connection A3 of the splitter 42 is connected to a connection S4 of the switching device 40. A connection A2 of the splitter 42 is connected to a further signal connection 50 of the mobile radio module 38. Between the connection A2 and the connection A3 of the splitter 42, the splitter 42 can have an attenuation of 20 dB, for example. A connection A1 of the splitter 20 is connected to the secondary antenna connection 46. A control line 52 connects a control output 54 of the mobile radio module 36 to a control input 56 of the switching device 40. By producing a switching signal at the switching output 54, the mobile radio module 36 can thereby change over two switches 58, 60 of the switching device 40. In a first switching state, the connection S1 is connected to the connection S3 via the switch 60 and the connection S2 is connected to the connection S4 via the switch 58. Accordingly, in the first switching state, the signal connection 48 of the mobile radio module 38 is coupled to the main antenna 22 via the switching device 40 and the signal connection 46 is coupled to the secondary antenna 26. FIG. 2 shows the switching device 40 in a second switching state, in which the connection S2 is connected to the connection S3 via the switch 60 and the connection S1 is connected to the connection S4 via the switch 58. Hence, the mobile radio module 38 is connected via its signal connection 48 to the secondary antenna 26 and the mobile radio module 36 is connected via its signal connection 46 to the main antenna 22. The further signal connection 50 of the mobile radio module 38 is permanently connected to the secondary antenna 26 via the splitter 42. The mobile radio module 38 is designed to use the two signal connections 48, 50 to allow reception on the basis of an antenna diversity that is formed by the antennas 22, 26. To this end, the switching device 40 needs to have been switched to the first switching state.

Furthermore, the second mobile radio module can generate a signal 62 for indicating a transmission pulse from the second module. This signal can be used to take protective measures for the signal connection 50 of the first mobile radio module. In FIG. 2, this is the brief interruption of the antenna signal to the signal connection 50, for example.

In the case of the motor vehicle 10, telephone calls are transmitted by the telephone 12 via the mobile radio module 36, i.e. the GSM mobile radio module. The remainder of the useful data are transmitted via the LTE mobile radio module 38. As a result of the design of the mobile radio unit 18, both mobile radio modules 36, 38 share the antennas 22, 26. As already stated, the main antenna 22 has better reception properties than the antenna 26. In the case of the mobile radio unit 18, the antenna with the better reception properties, i.e. the main antenna 22, is connected to the LTE mobile radio module or to the GSM mobile radio module as required. By way of example, provision may be made for the main antenna 22 to be connected to the GSM module, i.e. the mobile radio module 36, during a telephone call. To this end, the switching device 40 is switched to the second switching state. In the example illustrated in FIG. 2, the GSM module controls the changeover logic of the antennas, i.e. the switching device 14. This ensures that during a telephone call the GSM mobile radio module can reach the surrounding base stations, that is to say the base station 30, for example, by radio with as little shielding as possible. The mobile radio unit 18 is preferably implemented as a plug-in card that can be plugged in, for example in a plug-in leaf provided for this purpose in the infotainment system 14. In this case, provision may be made for the GSM mobile radio module 36 to be controlled by the mobile radio module 38. This results in the advantage that the remainder of the components of the infotainment system 14 only need to be designed to communicate with the mobile radio module 38, i.e. to interchange the data to be transmitted or the received data. It is then possible for splitting of the data between the mobile radio module 38 and the mobile radio module 36 to be effected within the mobile radio unit 18 by an appropriate signal processing section of the mobile radio module 38.

It is also possible for the switching device 40 to be changed over while the mobile radio module 38 is already interchanging user data with the mobile radio station 32. Mobile radio standards are usually designed such that an alteration in the transmission characteristics of the radio link does not result in complete disconnection of a connection. Thus, when the switching device 40 is switched from the first switching state (antenna diversity) to the second switching state (signal connections 48 and 50 are both coupled to the secondary antenna 26), the response of the mobile radio module 38 is adjusted in the usual manner and the useful data transmission can be continued at a reduced transmission rate. The reduced data transmission rate is usually not noticed by the user, since changeover to the second switching state occurs only when a telephone call arrives or a telephone connection is set up from the telephone 12. In other words, the changeover takes place only when the user of the motor vehicle 10 is using the telephone, which is not conspicuous during a telephone call.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A mobile radio apparatus for a motor vehicle, comprising:
   one or more processors to implement:
      a first mobile radio module to interchange a first mobile radio signal with a first external mobile radio station via a first signal connector of the first mobile radio module, the first mobile radio signal being based on at least one first mobile radio standard; and
      a second mobile radio module to interchange a second mobile radio signal with a second external mobile radio station via a second signal connector of the second mobile radio module, the second mobile radio signal being based on a second mobile radio standard, the second mobile radio standard being different from the first mobile radio standard;
   first and second antennas to selectively transmit the first and second mobile radio signals; and
   a switch connected to the first and second antennas and to the first and second signal connectors, to change over, based on a switching signal, between a first switching state, in which the first signal connector is coupled to the first antenna and the second signal connector is coupled to the second antenna, and a second switching state, in which the first signal connector is coupled to the second antenna and the second signal connector is coupled to the first antenna, wherein
   the switching signal is produced so as to switch the switch to the second switching state at a beginning of a voice transmission and to maintain the switch in the second switching state during voice telephony.

2. The mobile radio apparatus as claimed in claim 1, wherein
   the first mobile radio module interchanges as the first mobile radio signal, digital user data that are different from voice data, and
   the second mobile radio module interchanges a voice telephony signal as the second mobile radio signal.

3. The mobile radio apparatus as claimed in claim 2, wherein the switching signal is produced in the second mobile radio module.

4. The mobile radio apparatus as claimed in claim 1, wherein
   the switching signal is produced in the second mobile radio module,
   the second radio module has a control output to output the switching signal, and
   the control output of the second radio module is coupled to a control input of the switch.

5. The mobile radio apparatus as claimed in claim 1, wherein the second mobile radio module is a Global System for Mobile Communications (GSM) module.

6. The mobile radio apparatus as claimed in claim 5, further comprising a protection unit to protect the first mobile radio module from a GSM transmission pulse generated by the second module.

7. The mobile radio apparatus as claimed in claim 1, wherein the first mobile radio signal is based on at least one mobile radio standard selected from the group consisting of a Long Term Evolution (LTE) standard, a High Speed Packet Access (HSPA) standard, and a Universal Mobile Telecommunications System (UMTS) standard.

8. The mobile radio apparatus as claimed in claim 1, wherein the first mobile radio module has a signal communication unit that continuously connects the first mobile radio signal to the second antenna regardless of the switching state of the switch.

9. The mobile radio apparatus as claimed in claim 8, wherein
the signal communication unit of the first mobile radio module is connected to the second antenna via a switch,
the second mobile radio module is a Global System for Mobile Communications (GSM) module, and
the switch disconnects the first mobile radio module from the second antenna if a GSM transmission pulse is generated by the second module.

10. The mobile radio apparatus as claimed in claim 8, wherein the second antenna is connected via a splitter to the switch and to the signal communication unit of the first radio module.

11. The mobile radio apparatus as claimed in claim 1, wherein the first and second mobile radio modules are arranged on a common plug-in card.

12. The mobile radio apparatus as claimed in claim 1, wherein the switching signal and the switch minimize antenna losses for the second mobile radio module through the use of only a single switch in the event of a telephone call.

13. The mobile radio apparatus as claimed in claim 1, wherein the first and second external mobile radio stations are provided in a single mobile radio facility.

14. The mobile radio apparatus as claimed in claim 1, wherein a base station serves as at least the second external mobile radio station.

15. A motor vehicle comprising:
first and second antennas; and
a mobile radio apparatus comprising:
one or more processors to implement:
a first mobile radio module to interchange a first mobile radio signal with a first external mobile radio station via a first signal connector of the first mobile radio module and via at least one of the first and second antennas, the first mobile radio signal being based on at least one first mobile radio standard; and
a second mobile radio module to interchange a second mobile radio signal with a second external mobile radio station via a second signal connector of the second mobile radio module and via at least one of the first and second antennas, the second mobile radio signal being based on a second mobile radio standard, the second mobile radio standard being different from the first mobile radio standard; and
a switch connected to the first and second antennas and to the first and second signal connectors, to change over, based on a switching signal, between a first switching state, in which the first signal connector is coupled to the first antenna and the second signal connector is coupled to the second antenna, and a second switching state, in which the first signal connector is coupled to the second antenna and the second signal connector is coupled to the first antenna, wherein
the switching signal is produced so as to switch the switch to the second switching state at a beginning of a voice transmission and to maintain the switch in the second switching state during voice telephony.

16. The motor vehicle as claimed in claim 15, wherein the first antenna has lower directivity than the second antenna.

17. The motor vehicle as claimed in claim 15, wherein the first antenna is arranged on a roof of the motor vehicle.

18. A method for operating a mobile radio apparatus of a motor vehicle, the mobile radio apparatus comprising:
one or more processors to implement:
a first mobile radio module to interchange a first mobile radio signal with a first external mobile radio station via a first signal connector of the first mobile radio module, the first mobile radio signal being based on at least one first mobile radio standard; and
a second mobile radio module to interchange a second mobile radio signal with a second external mobile radio station via a second signal connector of the second mobile radio module, the second mobile radio signal being based on a second mobile radio standard, the second mobile radio standard being different from the first mobile radio standard;
first and second antennas to selectively transmit the first and second mobile radio signals;
a switch connected to the first and second antennas and to the first and second signal connectors, to change over, based on a switching signal, between a first switching state, in which the first signal connector is coupled to the first antenna and the second signal connector is coupled to the second antenna, and a second switching state, in which the first signal connector is coupled to the second antenna and the second signal connector is coupled to the first antenna,
the method comprising:
keeping the switch in the second switching state during voice telephony; and
keeping the switch in the first switching state when the voice telephony signal is not being transmitted.

19. The method as claimed in claim 18, wherein an incoming call from outside the motor vehicle prompts the switch to be changed over from the first switching state to the second switching state by virtue of the switching signal.

20. The method as claimed in claim 18, wherein
the second mobile radio module interchanges a voice telephony signal as the second mobile radio signal, and
call setup for a voice connection by the second mobile radio module prompts the switch to be changed over from the first to the second switching state by virtue of the switching signal.

21. The mobile radio apparatus as claimed in claim 1, wherein the first and second switching states enable simultaneous use of the first and second mobile radio modules.

22. The motor vehicle as claimed in claim 15, wherein the first and second switching states enable simultaneous use of the first and second mobile radio modules.

23. The method as claimed in claim 18, wherein the first and second switching states enable simultaneous use of the first and second mobile radio modules.

* * * * *